May 17, 1960 P. E. PRITCHARD 2,937,243

PHONOGRAPH ARMATURE AND STYLUS ASSEMBLY

Filed Feb. 27, 1958 2 Sheets-Sheet 1

INVENTOR:
PETER E. PRITCHARD,
BY Charles W. Helzer
HIS ATTORNEY.

May 17, 1960 P. E. PRITCHARD 2,937,243

PHONOGRAPH ARMATURE AND STYLUS ASSEMBLY

Filed Feb. 27, 1958 2 Sheets-Sheet 2

INVENTOR:
PETER E. PRITCHARD,
BY Charles W. Helzer
HIS ATTORNEY.

United States Patent Office 2,937,243

Patented May 17, 1960

2,937,243

PHONOGRAPH ARMATURE AND STYLUS ASSEMBLY

Peter E. Pritchard, Skaneateles, N.Y., assignor to General Electric Company, a corporation of New York Application February 27, 1958, Serial No. 717,942

14 Claims. (Cl. 179—100.41)

The present invention relates to new and improved phonograph pickup cartridges of the variable reluctance type and to replacement stylus assemblies therefor.

More particularly, the invention relates to a new and improved magnetic phonograph pickup cartridge having a record engaging stylus secured in a stylus supporting armature which is shaped in the form of a crank, and is floatingly supported on the bottom of the cartridge by a block of damping material.

Because one of the most important characteristics of any phonograph pickup cartridge is the pressure which the stylus of the cartridge exerts against the grooves of a record, considerable activity has been devoted by the industry towards development of pickup cartridges having low tracking pressures. This characteristic is important for it has been conclusively established that record life is directly related to the tracking pressure of the phonopickup cartridge with which the record is used. It has also been determined that below some critical tracking pressure value, the life of a record can be doubled or tripled. In the present invention it is proposed to reduce the tracking pressure of a phonograph pickup cartridge by a unique shaping and suspension for the record engaging stylus arm of the cartridge.

It is therefore one object of the invention to provide a new and improved magnetic phonograph pickup cartridge and replacement stylus assembly therefor having an extremely low tracking pressure.

Another object of the invention is to provide a new and improved magnetic phonograph pickup cartridge having a record engaging stylus secured in a stylus supporting armature that is crank-shaped, and is secured to the bottom of the cartridge by a plurality of blocks of damping material.

In practicing the invention a phonograph pickup cartridge of the variable reluctance type is provided which includes a body member having a pair of downwardly depending core members ending in spaced-apart pole pieces with the core members having pickup coils surrounding them. A permanent magnet supported by the body member is spaced from the core members, and spaced from the permanent magnet is a removable stylus assembly. The stylus assembly comprises a first arm of non-magnetic material secured to the post cantilever-fashion, and at least one block of damping material secured to the first arm of non-magnetic material, and a crank-shaped armature of magnetic material is secured to the block of damping material. The crank-shaped armature has a downwardly depending crank arm portion to which a record engaging stylus is attached at a point such that it is disposed between the spaced-apart pole pieces.

Other objects, features and attendent advantages of this invention may be better understood by reference to the following description taken in connection with the accompanying drawings, wherein.

Figure 1:
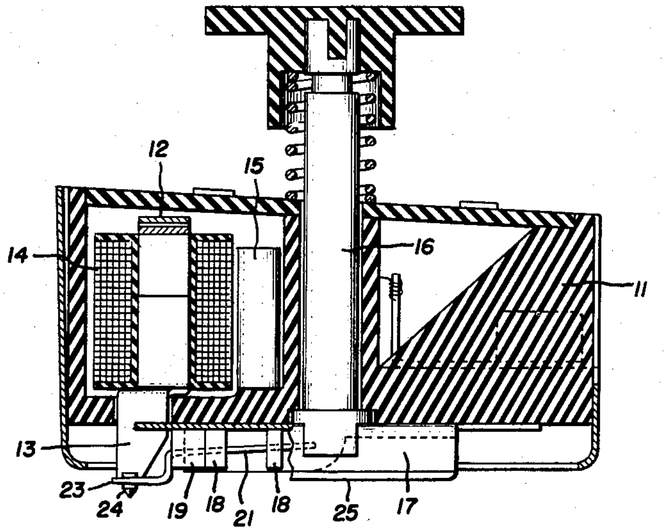
Fig. 1 is a sectional view of a magnetic phonograph pickup cartridge constructed in accordance with the present invention.
Figure 2:
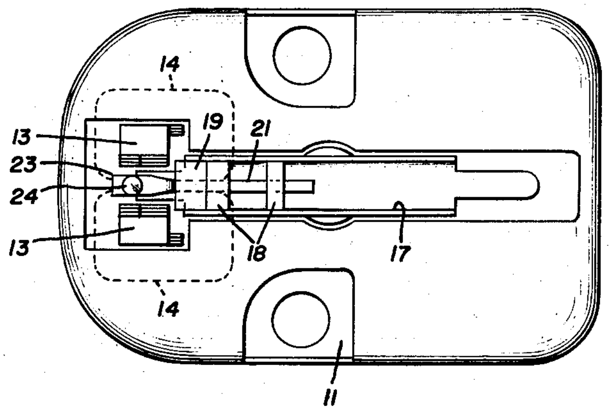
Fig. 2 is a bottom plan view of the magnetic pickup cartridge illustrated in Fig. 1.

The magnetic phonograph pickup cartridge illustrated in Figs. 1 and 2 is of the variable magnetic reluctance type, and includes a body member 11 which may be formed of any suitable plastic material such as an epoxy resin. The body member 11 has certain openings shaped therein in which are supported the component parts of the phonograph cartridge. These parts include a pair of downwardly depending core members 12 which end in spaced-apart pole pieces 13, and which may be formed from any suitable magnetic material such as a nickel alloy steel. Surrounding the downwardly depending core members 12 are a pair of electrical pickup coils which comprise conventional helically-wound insulated wire coils that may be electrically connected in series circuit relationship, and are connected to output terminal posts from which an electrical output signal from the cartridge is derived. Spaced from the core members 12 and pickup coils 14 is a permanent magnet 15 which preferably comprises a small cylindrically-shaped alnico bar magnet seated in a suitable opening formed in the body member 11 for supporting the magnet. Adjacent permanent magnet 15 on the side thereof away from the core members 12 is an opening extending through the body member 11 in which is supported a post 16 comprising a part of a replaceable stylus assembly shown more clearly in Fig. 3. The post 16 may terminate in an end cap which coacts with a coil compression spring to retain the replaceable stylus assembly in position on the pickup cartridge. Secured to the lower end of post 16 T-fashion is a channel member 17 which is formed of non-magnetic material such as brass, and is generally U-shape in cross-section. Seated in the U-shape channel member 17 are a plurality of blocks of damping material 18 and 19 which are formed of Butyl rubber or some other suitable resilient material. The damping blocks 18 are secured in position in the channel member 17 by a suitable adhesive, and damping block 19 is key-stone wedge-shape in configuration, and is freely supported in the channel member 17. Each of the damping blocks 18 and 19 have suitable apertures 20 formed therein for receiving an elongated arm 21 or end of a crank-shaped armature 22 of magnetic material. The armature 22 is a generally Z-shaped crank having an elongated arm 21 which extends to the openings 20 in each of the damping blocks 18 and 19. If desired, the elongated arm 22 may be secured in the apertures 20 by a suitable adhesive to further assure a long and proper operation of the replaceable stylus assembly. The damping blocks 18 and 19 are arranged in such a manner that the key-stone wedge-shape damping block 19 is positioned adjacent a downwardly depending crank arm portion 23 of the crank-shaped armature 22 in which a record engaging stylus 24 is secured. To complete the assembly, a dust cap 25 formed from a plastic material is placed over the open side of channel member 17, and is secured in position by a suitable adhesive so as to prevent dust getting into the interior of the replaceable stylus assembly. The replaceable assembly is so designed that upon securing post 16 to the body member 11 of the phonograph pickup cartridge in the manner shown in Fig. 1, the record engaging stylus 24 secured to the downwardly depending crank arm portion of the crank-shaped armature is disposed intermediate the spaced-apart pole pieces 13 of the cartridge. By this construction the armature 22 of magnetic material serves to complete a magnetic circuit between the permanent magnet 15, spaced-apart pole pieces 13, and core member 12, and which includes a variable air gap between the spaced-apart pole pieces 13 and the region of the crank arm portion 23 in the vicinity of the record engaging stylus 24, and a wide air gap between the ends of core members 12 and permanent magnet 15 remote from the armature 22. The variable air gap is of course varied in accordance with the undulations in the record grooves with which the phonograph pickup cartridge is used so as to produce variations in the flux threading the pickup coil 14. This variation in the flux threading the pickup coil 14 results in the production of an electrical output signal carrying the intelligence modulated on the record groove, that may be supplied to a suitable amplifier and loudspeaker system connected to the electrical output terminals of the cartridge.

In operation, the flexible magnetic armtaure 22 is vibrated intermediate the spaced-apart pole pieces 13 by the undulations in the record groove with which the phonograph pickup cartridge is used. Because of the manner in which the magnetic armature 22 is secured to the phonograph cartridge through the damping blocks 18 and 19, this armature vibrates in the manner of a simple rigid mass. This free vibration is enhanced by the elongated downwardly depending crank arm portion 23 on which the record engaging stylus 24 is secured for the reason that the crank arm portion in effect extends the lever arm provided to the record groove as it works on the stylus 24 so as to greatly reduce the force required to produce the desired vibration of the magnetic armature. This feature, together with the feature of securing of the magnetic armature 22 to the phonograph cartridge through the damping blocks 18 and 19 combine to greatly reduce the resistance to movement presented by the stylus 24 to the undulations of a record groove thereby reducing the tracking pressure of the stylus, and greatly reducing the wear and tear on the record groove.

From the above-description therefore it can be appreciated that the invention provides a new and improved magnetic phonograph pickup cartridge and replaceable stylus therefor which includes a flexible magnetic stylus supporting armature that is shaped in the form of a crank and floatingly supported on the bottom of the pickup cartridge by a block of damping material, and which provides a pickup cartridge having an extremely low tracking pressure.

Figure 4:
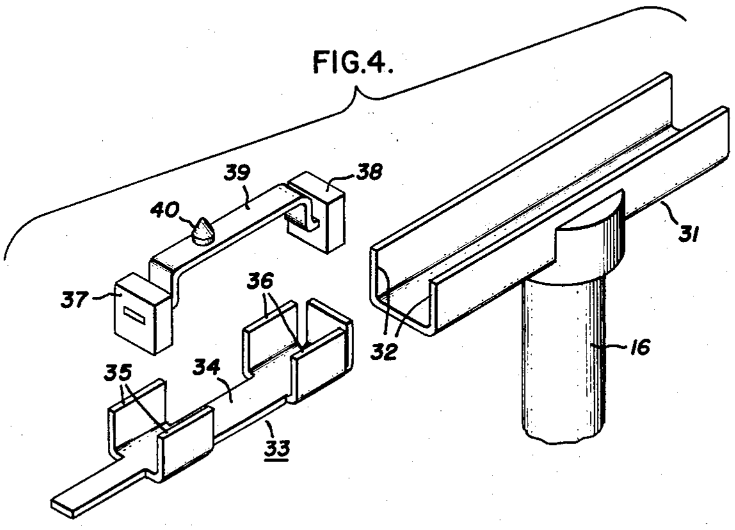
Fig. 4 is an exploded perspective view of a second form of a novel replaceable stylus assembly suitable for use in the phonograph pickup cartridge illustrated in Figs. 1 and 2.

A second form of a replaceable stylus assembly for use in the magnetic phonograph cartridge shown in Figs. 1 and 2, is illustrated in Fig. 4. This replaceable stylus assembly includes a post 16 adapted to be removably secured in the body member 11 of the magnetic phonograph pickup cartridge shown in Figs. 1 and 2, and has a channel member 31 secured to the end thereof T-fashion. The channel member 31 is generally U-shape in configuration or cross-section and has the ends of the U thereof indicated at 32 rolled over to serve as a retaining track. Channel 31 is open-ended and is adapted to slidably receive and frictionally retain a slide-in type replaceable stylus assembly indicated at 33. The slide-in replaceable stylus 33 comprises a base 34 of non-magnetic material such as brass for slidable insertion and frictional retention in the open-ended channel member 31. The base 34 has a pair of spaced-apart side portions 35 and 36 which define retaining receptacles. These retaining receptacles are adapted to receive and seat a pair of spaced-apart blocks of damping material 37 and 38 formed of Butyl rubber or some other resilient damping material. The blocks of damping material 37 and 38 may be adhesively secured in the retaining receptacles defined by the spaced-apart side portions 35 and 36 of base 34, and have apertures centrally formed therein for receiving the respective ends of a magnetic armature 39. The magnetic armature 39 is crank-shaped in the form of a winged-U with each of the wings or ends of the U being seated or secured in the apertures formed in the damping blocks 37 and 38. This construction allows the U portion of the crank-shaped armature 39 to be downwardly depending with a record engaging stylus 40 secured therein. Thus constructed the resulting slidable replacement stylus is slid into the open end of the U-shape channel 31 and frictionally retained in place therein and the resulting structure plugged into a phonograph pickup cartridge such as that illustrated in Figs. 1 and 2 in place of the post 16 and channel member 17 shown.

Figure 3:
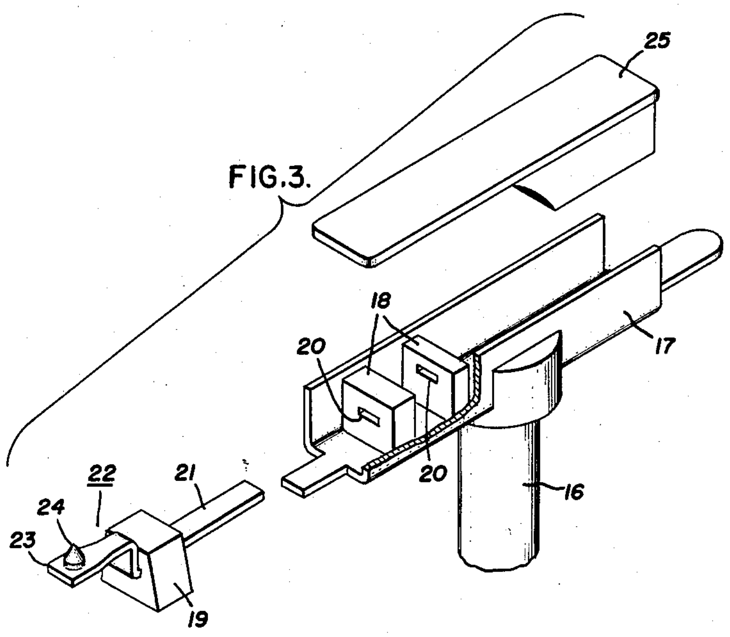
Fig. 3 is an exploded perspective view of a replaceable stylus assembly which comprises a part of the phonograph cartridge shown in Figs. 1 and 2, and which constitutes a major part of the present invention.

In operation, the construction illustrated in Fig. 4 of the drawing functions in much the same manner as described with relation to the structure shown in Fig. 3. In particular, the elongated crank arm provided by the U portion of the crank-shaped magnetic armature 39 vibrates in the manner of a simple mass between the spaced-apart pole pieces of the magnetic cartridge to thereby vary the air gap between the pole pieces and hence the magnetic flux threading the pickup coils. This results in the development of an output electrical signal in the pickup coil. Vibration of the stylus and armature by the undulation in the record groove is facilitated by the increased lever arm provided to the record engaging stylus by the depending U-shape crank arm portion of the armature. This construction effectively decreases the resistance to movement of the stylus presented to the undulations of the record grooves, and this increased lever arm effect when coupled with the resilient mounting provided by the damping blocks 37 and 38 greatly reduces the tracking pressure of the phonograph cartridge.

From the foregoing description it can be appreciated that the invention provides a new and improved magnetic phonograph pickup cartridge and replaceable stylus assembly therefor wherein a crank-shaped stylus supporting armature of magnetic material is floatingly supported on the bottom of the cartridge by a block of damping material, and results in a pickup cartridge having an extremely low tracking pressure.

While the present invention has been described with respect to the particular embodiments thereof disclosed, it is believed apparent that numerous modifications and variations may be made in the present invention by those skilled in the art in the light of the present teachings. It is therefore to be understood that all such variations and alterations are intended to come within the true spirit and scope of the present invention, as defined by the appended claims.

What I claim as new and desire by Letters Patent of the United States is:

1. A phonograph pickup cartridge of the variable reluctance type including in combination a body member, a pair of downwardly depending core members having spaced-apart pole pieces supported by said body member, a pair of pickup coils respectively surrounding each core member, a permanent magnet supported on said body member and spaced from the core members, a post adapted to be supported in said body member, a first arm of non-magnetic material secured to said post cantilever-fashion, at least one block of damping material secured to said first arm of non-magnetic material, and a crank-shaped armature of magnetic material secured to said damping material and having a pair of substantially right-angle bends providing a downwardly depending crank arm portion to which a record engaging stylus is attached, said crank arm portion being disposed between the spaced-apart pole pieces, said armature being supported solely by said damping material.

2. In a phonograph pickup cartridge of the variable reluctance type including a body member supporting a pair of downwardly depending pole pieces having pickup coils associated therewith and a permanent magnet spaced from the pole pieces, the combination of a plug-in stylus assembly comprising a post adapted to be removably and frictionally supported in said body member, a first arm of non-magnetic material secured to said post cantilever-fashion, at least one block of damping material secured to said first arm of non-magnetic material, a crank-shaped armature of magnetic material secured in said block of damping material and having a pair of substantially right-angle bends providing a downwardly depending crank arm portion, and a record engaging stylus secured to said crank arm portion, said crank arm portion being adapted to be disposed intermediate the spaced-apart pole pieces, said armature being supported solely by said damping material.

3. A plug-in stylus assembly comprising a post adapted to be removably and frictionally supported in the body member of a variable reluctance magnetic pickup cartridge, a first arm of non-magnetic material secured to said post cantilever-fashion, at least one block of damping material secured to said first arm of non-magnetic material, a crank-shaped armature of magnetic material secured in said block of damping material and having a pair of substantially right-angle bends providing a downwardly depending crank arm portion, and a record engaging stylus secured to said crank arm portion, said crank arm portion being adapted to be disposed intermediate the pole pieces of a magnetic pickup cartridge with which the assembly is used, said armature being supported solely by said damping material.

4. The combination set forth in claim 3 wherein said first arm is channel-shaped with its open side facing down and there are three blocks of damping material with two of the blocks being secured in the channel-shaped first arm and the third block being keystone wedge-shaped and freely seated in the channel-shaped first arm, and said armature of magnetic material is in the form of an inverted Z-shaped crank having one elongated arm extending through and secured to said three blocks of damping material with the third freely supported keystone wedge-shaped block being adjacent a downwardly depending remaining crank arm portion of the armature in which the record engaging stylus is secured.

5. A magnetic phonograph pickup of the variable reluctance type including a body member, a pair of spaced-apart downwardly depending core members having spaced-apart pole pieces supported by said body member, an open-ended channel member mounted on the bottom of said pickup and extending in the direction of said pole pieces, at least one base of non-magnetic material slidably mounted in said channel and frictionally retained thereby, at least one block of damping material secured to said base, a crank-shaped armature of magnetic material secured to said damping material and having a pair of substantially right-angle bends providing a downwardly depending crank arm portion to which a record engaging stylus is attached, said crank arm portion being disposed between the spaced-apart pole pieces, said armature being supported solely by said damping material.

6. A replaceable stylus combination comprising a post adapted to be removably mounted in a phonograph pickup cartridge of the variable reluctance type, a channel member secured to one end of said post and extending transversely to the longitudinal axis thereof, at least one stylus support assembly mounted in said channel member, said channel member and said assembly having interengaging portions whereby said assembly can be frictionally retained within said channel member, said assembly comprising a longitudinally extending non-magnetic base, at least one block of damping material secured to said non-magnetic base, a crank shaped armature of magnetic material secured in said block of damping material and having a pair of substantially right-angle bends providing a downwardly depending crank arm portion, and a record engaging stylus secured to said crank arm portion, said crank arm portion being adapted to be disposed intermediate the spaced-apart pole pieces, said armature being supported solely by said damping material.

7. A replaceable stylus assembly for a magnetic phonograph pickup cartridge comprising a base of non-magnetic material for slidable insertion and frictional retention in an open-ended channel member supported on the bottom of a phonograph pickup, at least one block of damping material secured to said base of non-magnetic material, and a crank-shaped armature of magnetic material secured in said block of damping material and having a pair of substantially right-angle bends providing a downwardly depending crank arm portion, and a record engaging stylus secured to said crank arm portion, said crank arm portion being adapted to be disposed intermediate the pole pieces of a magnetic pickup cartridge with which the assembly is used, said armature being supported solely by said damping material.

8. The combination set forth in claim 7 wherein said base has spaced-apart side portions defining a retaining receptacle in which blocks of damping material are secured and said crank-shaped armature is in the form of a winged-U with each wing being secured in a respective one of the spaced-apart damping blocks, and with the U portion of the armature depending downwardly and having the record engaging stylus secured therein.

9. A plug-in stylus assembly comprising a post adapted to be removably and frictionally supported in the body member of a variable reluctance magnetic pickup cartridge, a channel-shaped arm of non-magnetic material secured to said post cantilever-fashion with its open side facing down, two blocks of damping material secured in said channel-shaped arm and a third block of damping material being keystone wedge-shaped and freely seated in said channel-shaped arm, and a crank-shaped armature of magnetic material having an elgonated arm extending through and secured to said three blocks of damping material, said crank-shaped armature having a downwardly depending crank arm adjacent said third block, and a record engaging stylus secured to said crank arm, said crank arm being adapted to be disposed intermediate the pole pieces of a magnetic pickup cartridge with which the assembly is used.

10. A replaceable stylus assembly for a magnetic phonograph pickup cartridge comprising a base of non-magnetic material for slidable insertion and frictional retention in an open-ended channel member supported on the bottom of a phonograph pickup, said base having spaced-apart side portions defining a retaining receptacle, a pair of damping blocks secured in said retaining receptacle, a crank-shaped armature in the form of a winged-U with each wing being secured in a respective one of said damping blocks, the U portion of the armature depending downwardly, and a record engaging stylus secured to said U portion, said U portion being adapted to be disposed intermediate the pole pieces of a magnetic pickup cartridge with which the assembly is used.

11. A stylus assembly comprising a block of damping material, a crank-shaped armature having an elongated arm extending into said block and having a crank-arm portion extending laterally from said elongated arm externally of said block, said crank-arm portion extending beyond an edge of said block and terminating in an end portion extending in a direction substantially parallel to said elongated arm, and a stylus attached to and extending laterally from said end portion.

12. A stylus assembly comprising a support member, a block of damping material attached to said support member, a crank-shaped armature having an elongated arm extending into said block to be supported thereby and having a crank-arm portion extending laterally in a given direction from said elongated arm, said crank-arm portion terminating in an end portion extending in a direction substantially parallel to said elongated arm, and a stylus attached to and extending laterally in said given direction from said end portion.

13. A stylus assembly for use with a phonograph cartridge, comprising one or more blocks of damping material, means for positioning said blocks with respect to said cartridge, a crank-shaped armature having an elongated arm extending into said blocks and being supported solely by said one or more blocks, said armature being provided with a crank-arm portion extending laterally in a given direction from said elongated arm and terminating in an end portion extending in a direction substantially parallel to said elongated arm, and a stylus attached to and extending laterally in said given direction from said end portion.

14. A plug-in stylus assembly comprising a post adapted to be removably supported by a phonograph cartridge, a channel-shaped member attached to said post with the channel thereof extending in a direction perpendicular to the axis of said post, one or more blocks of damping material secured in said channel-shaped member along the axis thereof, a crank-shaped armature having an elongated arm extending into said blocks and being supported solely by said one or more blocks, said armature being provided with a crank-arm portion extending laterally in a given direction from said elongated arm and terminating in an end portion extending in a direction substantially parallel to said elongated arm, and a stylus attached to and extending in said given direction from said end portion.

References Cited in the file of this patent

UNITED STATES PATENTS

| | | |
|---|---|---|
| 2,469,933 | Schwarz | May 10, 1949 |
| 2,820,853 | Dally | Jan. 21, 1958 |

FOREIGN PATENTS

| | | |
|---|---|---|
| 754,409 | Great Britain | Aug. 8, 1956 |